United States Patent
Douniwa et al.

(10) Patent No.: US 6,687,784 B2
(45) Date of Patent: Feb. 3, 2004

(54) CONTROLLER FOR CONTROLLING NONVOLATILE MEMORY UNIT

(75) Inventors: Kenichi Douniwa, Wako (JP); Akihisa Fujimoto, Fussa (JP); Katsuyuki Nomura, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 09/954,015

(22) Filed: Sep. 18, 2001

(65) Prior Publication Data

US 2002/0069313 A1 Jun. 6, 2002

(30) Foreign Application Priority Data

Dec. 4, 2000 (JP) ........................................ 2000-368849

(51) Int. Cl.7 .............................................. G06F 12/16
(52) U.S. Cl. ....................................... 711/103; 711/156
(58) Field of Search ................................ 711/103, 154, 711/156

(56) References Cited

U.S. PATENT DOCUMENTS

| | | | | |
|---|---|---|---|---|
| 5,602,987 A | * | 2/1997 | Harari et al. ............ | 711/100 X |
| 5,644,539 A | * | 7/1997 | Yamagami et al. ..... | 711/103 X |
| 5,802,551 A | * | 9/1998 | Komatsu et al. ............ | 711/103 |
| 2001/0049764 A1 | * | 12/2001 | Lu et al. ..................... | 711/103 |

FOREIGN PATENT DOCUMENTS

JP          07-200418          8/1995

* cited by examiner

*Primary Examiner*—David L. Robertson
(74) *Attorney, Agent, or Firm*—Finnegan, Henderson, Farabow, Garrett & Dunner, L.L.P.

(57) ABSTRACT

A controller writes, after writing data into a nonvolatile memory unit, new management information that reflects the data wiring, into an area of the memory unit other than an area of the nonvolatile memory unit, which stores last management information. After that, the controller writes an old management information flag in relation to the last management information. Further, the controller searches the memory unit for updated, normal management information when initializing the memory system. If it does not find updated, normal management information, the controller restores updated management information on the basis of normal old management information related to the old management information flag.

14 Claims, 5 Drawing Sheets

CONTROLLER FOR CONTROLLING NONVOLATILE MEMORY UNIT

CROSS-REFERENCE TO RELATED APPLICATIONS

This application is based upon and claims the benefit of priority from the prior Japanese Patent Application No. 2000-368849, filed Dec. 4, 2000, the entire contents of which are incorporated herein by reference.

BACKGROUND OF THE INVENTION

1. Field of the Invention

The present invention relates to a controller for controlling a nonvolatile memory unit, useful when an abnormality has occurred while data is being written into the nonvolatile memory unit.

2. Description of the Related Art

Memory systems equipped with nonvolatile memory units, such as memory cards used as memory units that store various types of data such as image and music data, have recently become available. The nonvolatile memory unit is formed of at least one rewritable nonvolatile memory from which no stored data disappears even if the power is turned off.

Even in the nonvolatile memory unit, it is possible in the following case that data stored therein may be damaged. For example, a case where an abnormality, such as an interruption of the supply of power to the memory unit during a data write operation or a reduction in the power supply voltage of the unit, i.e. a write abnormality, has occurred. Data is also damaged when, because of a write abnormality, data that has not completely been written remains in the nonvolatile memory or data erasure is not completely executed. If management information stored in the nonvolatile memory to manage the memory itself is once damaged by a write abnormality, it is possible that no more normal writing will be executed or all data will be lost, even if a correct power voltage is supplied to the memory unit after the damage.

Jpn. Pat. Appln. KOKAI Publication No. 7-200418 proposes a semiconductor memory device equipped with a data storage section (nonvolatile memory unit) formed of a flash memory, in which even if the supply of power is interrupted while data is being written into the data storage section, data writing can be resumed after power is resupplied. This semiconductor memory device comprises a first memory that temporarily stores data transferred from a host device, a second memory that stores control information necessary to transfer data from the first memory to the data storage section, and a CPU (control means). The first and second memories are each formed of a nonvolatile memory, such as an FRAM (Ferroelectric Random Access Memory) (a registered trademark) that can temporarily store information even if no power is supplied to the semiconductor memory device, and can operate at a higher speed than the flash memories. When the supply of power has been interrupted while data is being transferred from the first memory to the data storage section, the CPU rewrites the transfer-interrupted data into the data storage section after power is resupplied. This rewriting is executed on the basis of control information stored in the second memory.

In the published technique, even if the supply of power is interrupted while data is being written into the data storage section (nonvolatile memory unit), the data writing is resumed after power is resupplied. To this end, however, the first and second memories (nonvolatile memories), which can hold data even if no power is supplied, are required as well as a memory for the data storage section.

BRIEF SUMMARY OF THE INVENTION

The present invention has been developed in light of the above and aims to enable a nonvolatile memory unit to be kept normally even if an abnormality occurs for some reason while data is being written into the nonvolatile memory unit, and hence to enable the memory unit to be used normally after the cause of the write abnormality is eliminated, without using any memory for holding data other than the memory unit's memory.

According to an aspect of the invention, there is provided a controller for controlling a nonvolatile memory unit that is formed of at least one nonvolatile memory. The nonvolatile memory unit stores management information for controlling the nonvolatile memory unit. The controller comprises management information writing means, old management information flag writing means, search means and restoration means. The management information writing means writes, after writing of data into the nonvolatile memory unit, new management information that reflects the writing of data, into an area of the nonvolatile memory unit other than an area of the nonvolatile memory unit which stores last management information. The old management information flag writing means writes, after the management information writing by the management information writing means, an old management information flag indicating that management information written by the management information writing means is old management information, in relation to the last management information stored in the nonvolatile memory unit. The search means searches the nonvolatile memory unit for updated, normal management information when the nonvolatile memory unit is initialized. The restoration means restores updated management information on the basis of normal old management information related to the old management information flag, if the search means does not find the updated, normal management information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the accompanying drawings.

Figure 1:
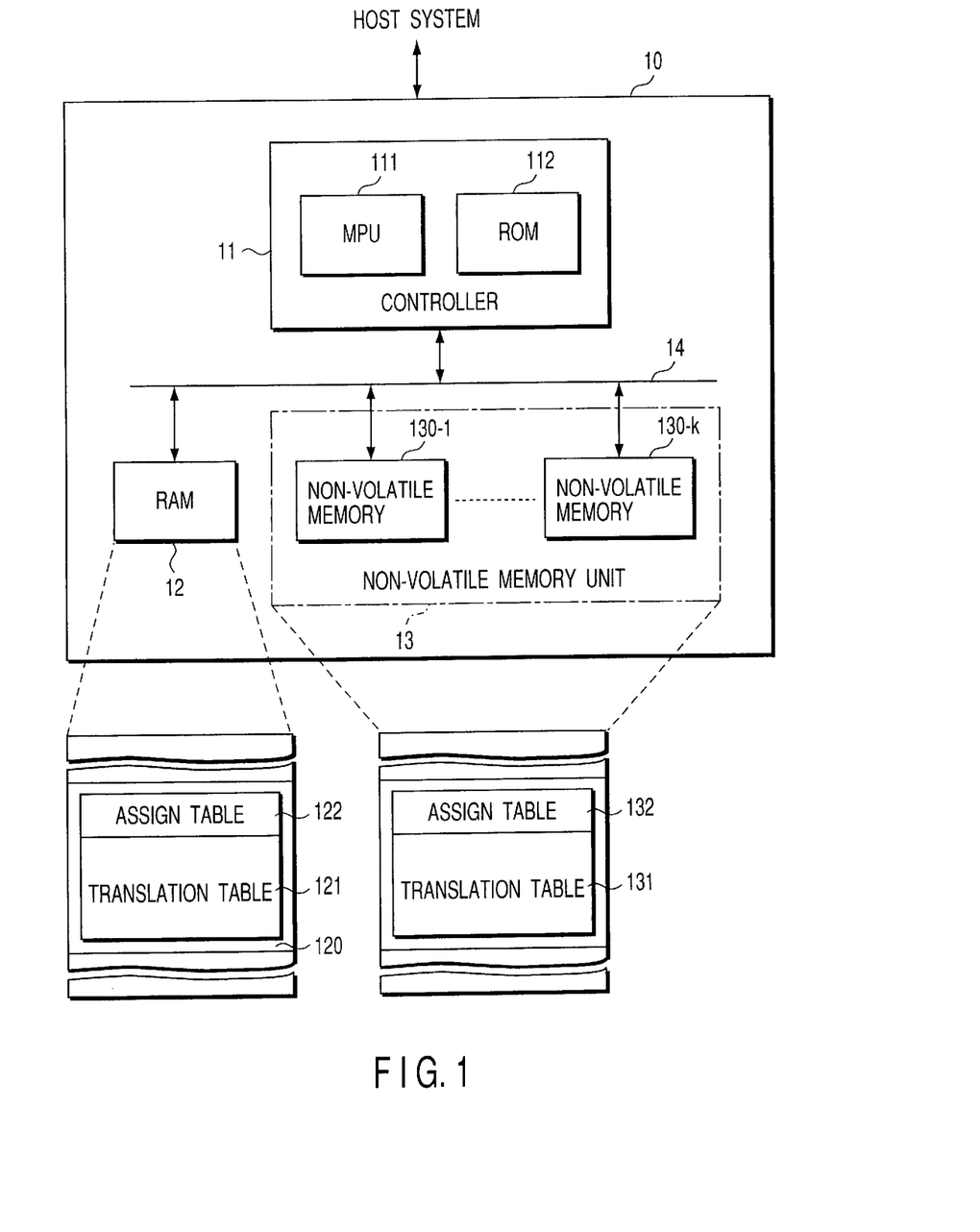
FIG. 1 is a block diagram illustrating the entire structure of a memory system 10 according to an embodiment of the present invention.

FIG. 1 is a block diagram illustrating the entire structure of a memory system 10 according to the embodiment.

In FIG. 1, suppose that the memory system 10 represents a memory card to be inserted, when used, into a card slot formed in an electronic device (host system) such as a personal computer, a digital camera or a game machine. The memory system (memory card) 10 comprises a controller 11, a RAM (Random Access Memory) 12, a nonvolatile memory unit 13 and a bus 14.

The controller 11 controls the nonvolatile memory unit 13. The controller 11 includes a microprocessor (MPU) 111 and a ROM 112. The ROM 112 is a program memory that prestores control programs (firmware) necessary to control the nonvolatile memory unit 13. The microprocessor 111 in the controller 11 interprets and executes a command supplied from the host system in accordance with a control program stored in the ROM 112. The host system is, for example, a personal computer and includes a card slot that permits the memory system (memory card) 10 of FIG. 1 to be inserted therein.

The RAM 12 is a volatile memory. The RAM 12 provides a work area (not shown) for the microprocessor 111, and a table area 120. The table area 120 is used to store a translation table 121 and an assign table 122. The tables 121 and 122 are copies of a translation table 131 and an assign table 132 described later.

The nonvolatile memory unit 13 is formed of at least one nonvolatile memory. In this case, suppose that the nonvolatile memory unit 13 is formed of a number "k" (k: an integer greater than 1) of rewritable nonvolatile memories 130-1–130-k. The nonvolatile memories 130-1–130-k are flash memories.

Figure 2:
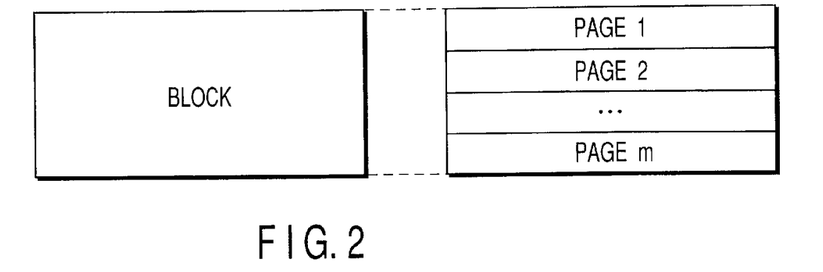
FIG. 2 is a view illustrating the relationship between a block and pages used to manage a nonvolatile memory unit 13.

When reading or writing data from or into the nonvolatile memory unit 13, the memory unit 13 is accessed in units of one page. Further, when erasing data stored in the nonvolatile memory unit 13, the memory unit 13 is accessed in units of one block. Each block includes a predetermined number (1 or more) of pages, e.g. a number "m" of pages of from page 1 to page m. FIG. 2 shows the relationship between a block and pages.

Figure 3:
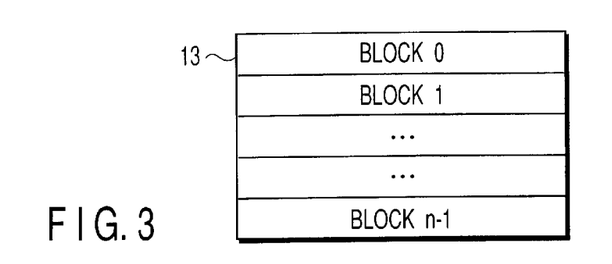
FIG. 3 is a view showing the structure of the nonvolatile memory unit 13.

The nonvolatile memory unit 13 comprises a plurality of blocks (physical blocks), e.g. a number "n" of blocks of from block 0 to block (n−1). FIG. 3 shows the block structure of the nonvolatile memory unit 13.

Each physical block in the nonvolatile memory unit 13 cannot be recognized by the host system. The host system only recognizes a logical block that forms a logical address space to which some of the physical blocks of the nonvolatile memory unit 13 are assigned. Accordingly, to enable the host system to designate a logical block so as to access the nonvolatile memory unit 13 in the memory system 10, it is necessary to translate a logical block number indicative of a logical block into a physical block number indicative of a physical block.

Figure 4:
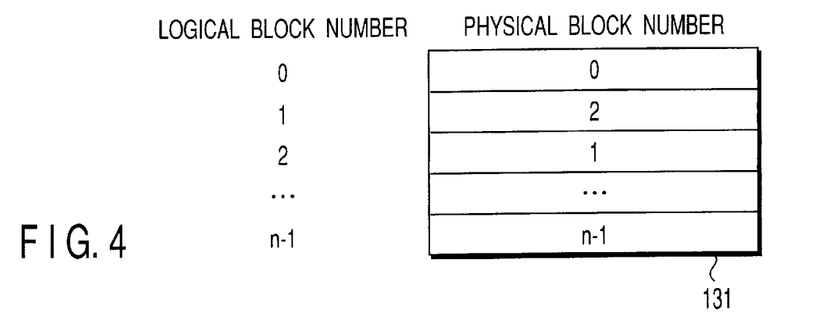
FIG. 4 is a view showing a data structure example in a translation table 131.

To enable the above translation, the nonvolatile memory unit 13 stores management information as assignment information that indicates the relationship between logical block numbers indicative of logical blocks, and physical block numbers indicative of physical blocks assigned to the respective logical blocks. In this embodiment, a translation table 131 of a data structure as shown in FIG. 4 is used as the management information (first management information). In the example of FIG. 4, entry numbers determined from the order of entries in the table 131 directly indicate respective block numbers. For each entry of the table 131, a physical block number corresponding to a logical block number assigned to each entry is set. A pair of block numbers; a logical block number assigned to each entry and a physical block number corresponding to the logical block number may be set for each entry. A plurality of pages, less than the number "m" of pages in one block, are assigned to the area that stores the table 131.

Figure 5:
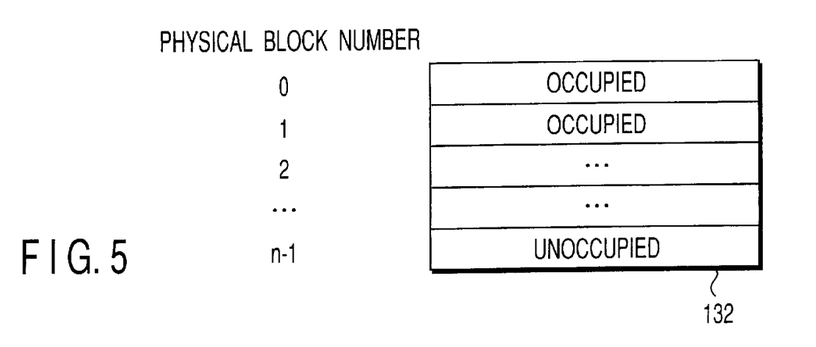
FIG. 5 is a view showing a data structure example in an assign table 132.

The nonvolatile memory unit 13 also stores management information (second management information) indicative of usable (unoccupied) physical blocks included in the number "n" of physical blocks that form the unit 13. The second management information indicates, for example, whether or not each block is now being used. In the embodiment, the assign table 132 of a data structure as shown in FIG. 5 is used as the second management information. In the example of FIG. 5, entry numbers determined from the order of entries in the table 132 directly indicate respective block numbers. For each entry of the table 132, a flag is set which indicates whether or not a physical block of a physical block number assigned to each entry is now being used. One page is assigned to the area that stores the table 132. The translation table 131 and the assign table 132 are stored in respective areas of a single voluntarily-selected block. Further, copies of the tables 131 and 132 are stored as the translation table 121 and the assign table 122 in the table area 120 of the RAM 12, respectively.

Figure 6:
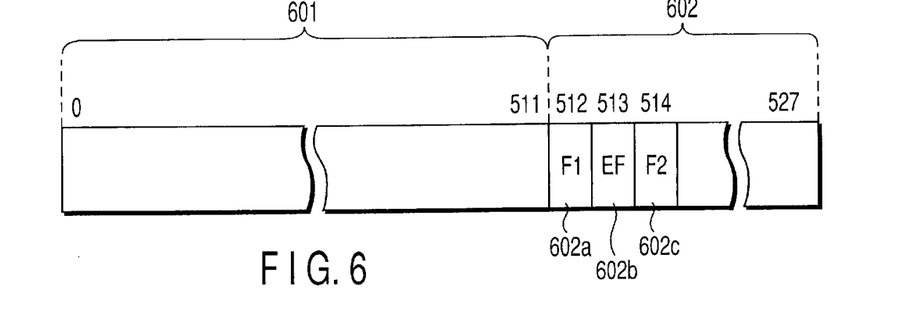
FIG. 6 is a view showing a data structure example of a page.

As shown in FIG. 6, each page of the nonvolatile memory unit 13 includes a 512-byte data section 601 of from byte 0 to byte 511, and a 16-byte redundancy section 602 of from byte 512 to byte 527. The redundancy section 602 includes 1-byte flag fields 602a, 602b and 602c. A management information flag F1, an end flag EF and an old management information flag F2 are set in the flag fields 602a, 602b and 602c, respectively. In this case, bytes 512, 513 and 514 are used as the fields of the flags F1, EF and F2, respectively. If the flag F1 is in the ON state (valid state), it indicates that management information is stored in the data section 601 of a target page. In other words, the flag F1 indicates whether or not a portion of the translation table 131 or the assign table 132 is stored in the data section 601 of the target page. If the flag EF is in the ON state (valid state), it indicates that the writing of management information is finished. In other words, the flag EF indicates whether or not the writing of the assign table 132 and the translation table 131 is finished. If the flag F2 is in the ON state (valid state), it indicates that management information stored in the data section 601 is old. In other words, the flag F2 indicates that the data section 601 stores old management information (invalid management information). The redundancy section 602 includes an ECC field (not shown) for setting therein an error correction code (ECC).

In this embodiment, if data "1" is written in all bits of the flag field 602a, 602b or 602c, the flag F1, EF or F2 is in the OFF (invalid) state. If, in this state, data "0" is written into all bits of the flag field, the corresponding flag is set in the ON (valid) state. In other words, writing of data "0" into the flag field 602a, 602b or 602c means that the valid flag F1, EF or F2 is written into the flag field. In the number "k" of nonvolatile memories 130-1–130-k that form the nonvolatile memory unit 13, it should be noted that data "0" written in any bit cannot be replaced with data "1". Accordingly, in the nonvolatile memory unit 13, to set the flags F1, EF and F2 in the OFF state, it is necessary to execute an erasure operation, in which data "1" is written into all bits of a target block.

Figure 7:
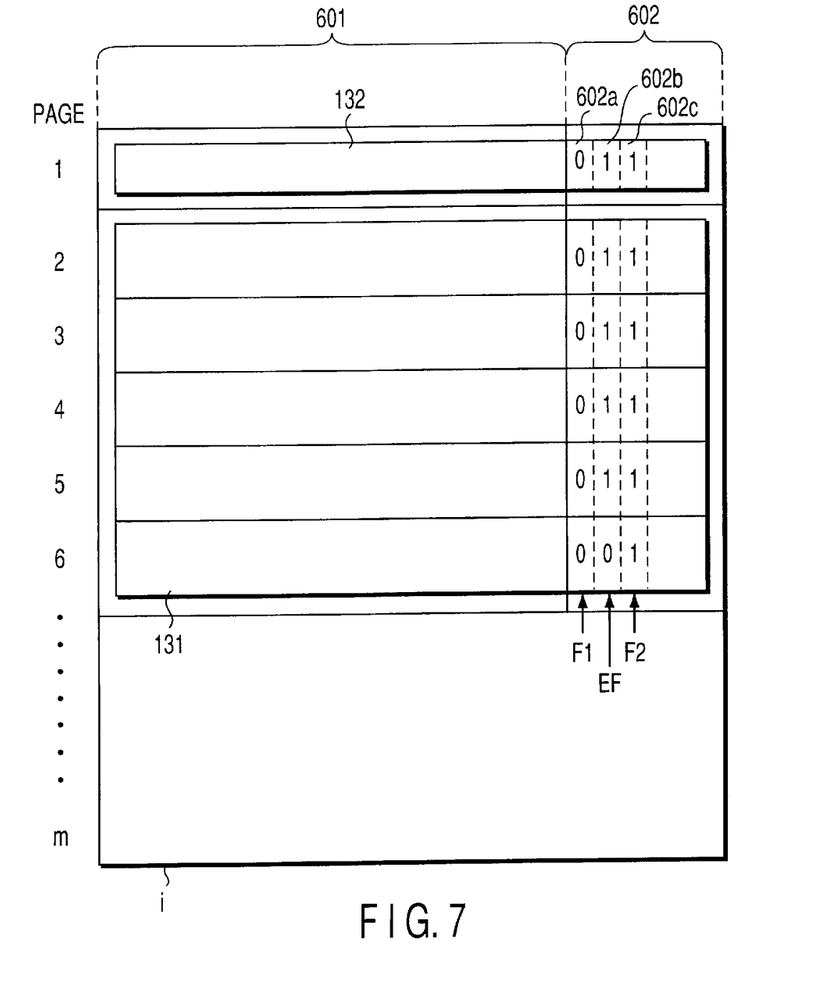
FIG. 7 is a view illustrating the relationship between the storage states, over pages, of the assign table 132 and the translation table 131 and flags F1, F2 and F3 in a block of the nonvolatile memory unit 13.

Suppose that physical block "i" in the nonvolatile memory unit 13 stores the translation table 131 and the assign table 132. FIG. 7 shows stored-state examples of the translation table 131 and the assign table 132 in the block "i". In the case of FIG. 7, the translation table 131 is stored in the data sections 601 of pages 2–6 of the block "i". The assign table 132 is stored in the data section 601 of page 1 of the block "i".

Thus, it is supposed that the assign table 132 and the translation table 131, i.e. management information, are written in pages 1–6 of the block "i". It is also supposed that the writing of the management information is finished, and the management information is not old management information. In this case, the flags F1, EF and F2 in the redundancy section 602 of pages 1–5 are set to ON (0), OFF (1) and OFF (1), respectively. Further, the flags F1, EF and F2 in the redundancy section 602 of page 6 are set to ON (0), ON (0) and OFF (1), respectively.

A description will now be given of an example of the initialization operation of the memory system (memory card) 10 of the structure shown in FIG. 1.

When initializing the memory system 10, the controller 11 retrieves management information from the nonvolatile memory unit 13. As aforementioned, the management information is necessary, for example, to translate a logical block into a physical block, and includes the translation table 131 and the assign table 132. The controller 11 stores the retrieved management information in the RAM 104. Referring to the flowchart of FIG. 8, a detailed description will be given of the management information search process executed by the controller 11 when initializing the memory system 10.

Figure 8:
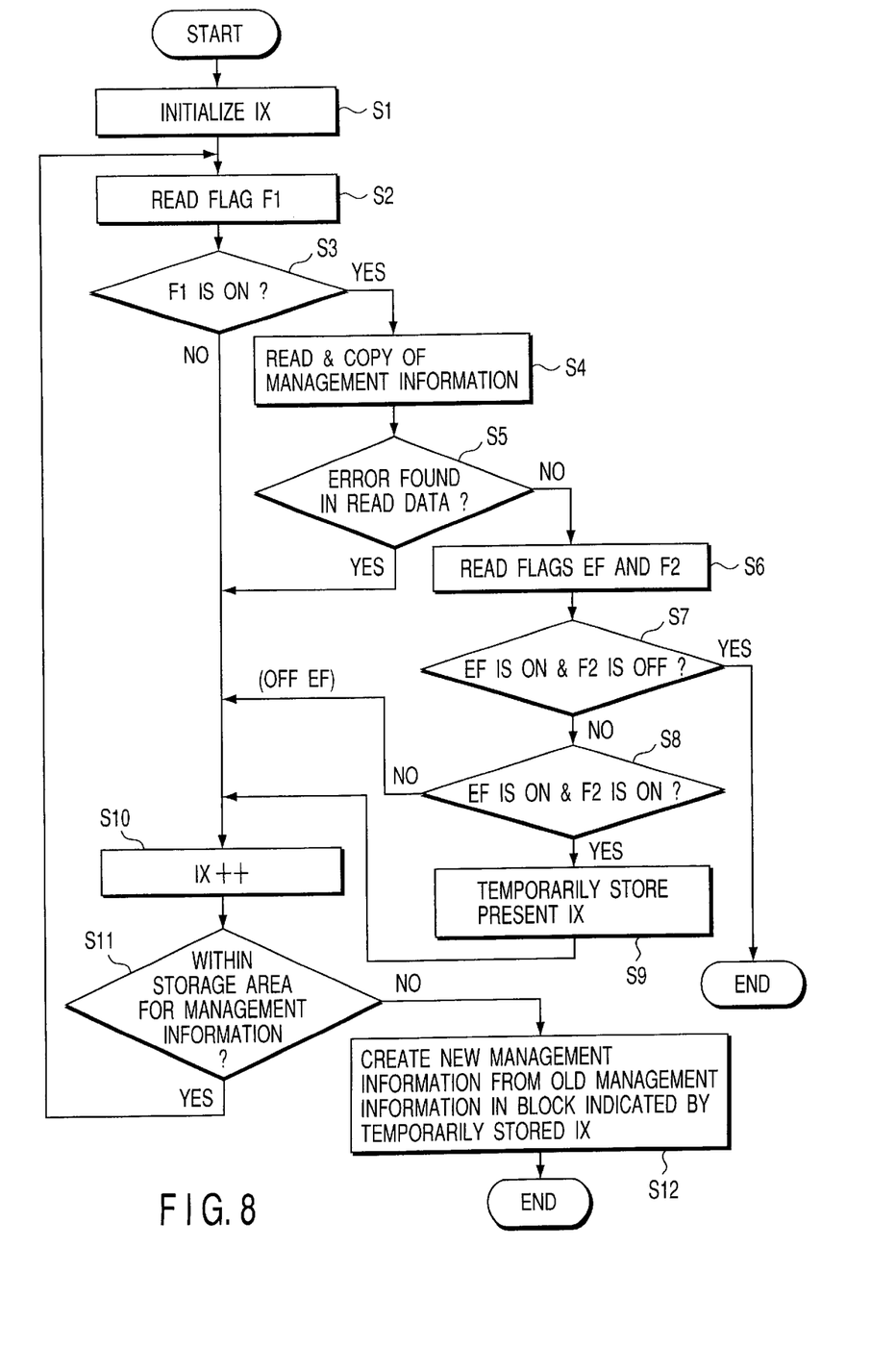
FIG. 8 is a flowchart useful in explaining an initialization operation executed in the embodiment.

The controller 11 first sets an index IX, indicative of a to-be-searched physical block, in the start block of that area included in the nonvolatile memory unit 13, which may store the management information (step S1). This area is called a "management information storage area". In this embodiment, the management information storage area includes all physical blocks that form the nonvolatile memory unit 13. The start and end blocks included in the physical blocks of the nonvolatile memory unit 13 correspond to those of the management information storage area.

The controller 11 then reads the management information flag F1 from page 1 of a block indicated by the index IX (step S2). If the read flag F1 is set to ON, i.e. if a valid flag F1 is written in page 1 (step S3), the controller 11 determines that the management information is stored in the block indicated by the index IX, thereby making the program proceed to step S4. If, on the other hand, the read flag F1 is set to OFF, i.e. if no valid flag F1 is written in page (step S3), the controller 11 determines that the management information is not stored in the block indicated by the index IX, thereby making the program proceed to step S10.

At the step S4, the controller 11 executes the following process. First, the controller 11 reads the translation table 131 and the assign table 132 as the management information, from the block indicated by the index IX. Subsequently, the controller 11 stores, in the table area 120 of the RAM 104, translation and assign tables 121 and 122 as respective copies of the read translation and assign tables 131 and 132.

After executing the step S4, the controller 11 determines whether or not the read data, i.e. the management information, is normal (step S5). If the read management information is normal, the controller 11 makes the program proceed to step S6. If the read management information contains an error, the controller 11 makes the program proceed to the step S10.

At the step S6, the controller 11 reads the end flag EF and the old management information flag F2 from the final page (page 6 in this case) in which the management information is written. If the read flags EF and F2 are set to ON and OFF, respectively (step S7), the controller 11 determines that the management information stored in the block indicated by the index IX is updated management information having been written normally. In this case, the controller 11 determines that updated management information could have been searched for, thereby finishing the search process.

On the other hand, if the flag EF is not set to ON (steps S7 and S8), the controller 11 determines that the management information stored in the block indicated by the index IX has not completely been written, and hence cannot be used. In this case, the controller 11 makes the program proceed to the step S10. If the flags EF and F2 are both set to ON (steps S7 and S8), the controller 11 determines that the management information stored in the block indicated by the index IX is invalid old management information, and hence should not be used. In this case, the controller 11 temporarily stores the index IX in a predetermined area of the RAM 12 (step S9), thereby making the program proceed to the step S10.

At the step S10, the controller 11 increments the index IX to execute a search in the next block. After that, the controller 11 determines whether or not the incremented index IX designates an area within the management information storage area (step S11). If it designates an area within the management information storage area, the controller 11 re-executes the step S2 et seq., using the incremented index IX. If, on the other hand, the incremented index IX designates an area outside the storage area, the controller 11 makes the program proceed to step S12.

At the step S12, the controller 11 executes the following error correction in light of the fact that it could not find any normal updated management information. The controller 11 recreates (restores) updated management information from the management information stored in the block that is indicated by the index IX temporarily stored in the RAM 12 at the step S9, i.e. from old management information. The old management information is management information that was not used since the corresponding flag F2 was valid. At this step, the old management information is directly used as updated management information, and stored as updated management information in the table area 120. Thus, management information created by the error correction process at the step S12 is used in a subsequent process.

Although in the above-described embodiment, management information is searched for in the management information storage area from the start block to the end block, the search may be executed in the opposite direction, i.e. from the end block to the start block. In other words, the search may be executed in any voluntarily-selected order. It is sufficient if all the blocks of the management information storage area are searched. Moreover, although the flag F1 is read at the step S2 and the other flags EF and F2 are read at the step S6, all the flags may be read at the step S2.

Using the copies of the thus-retrieved management information, i.e. the translation table 121 and the assign table 122 stored in the RAM 12, the controller 11 initializes the memory system 10 that includes the nonvolatile memory unit 13.

Figure 9:
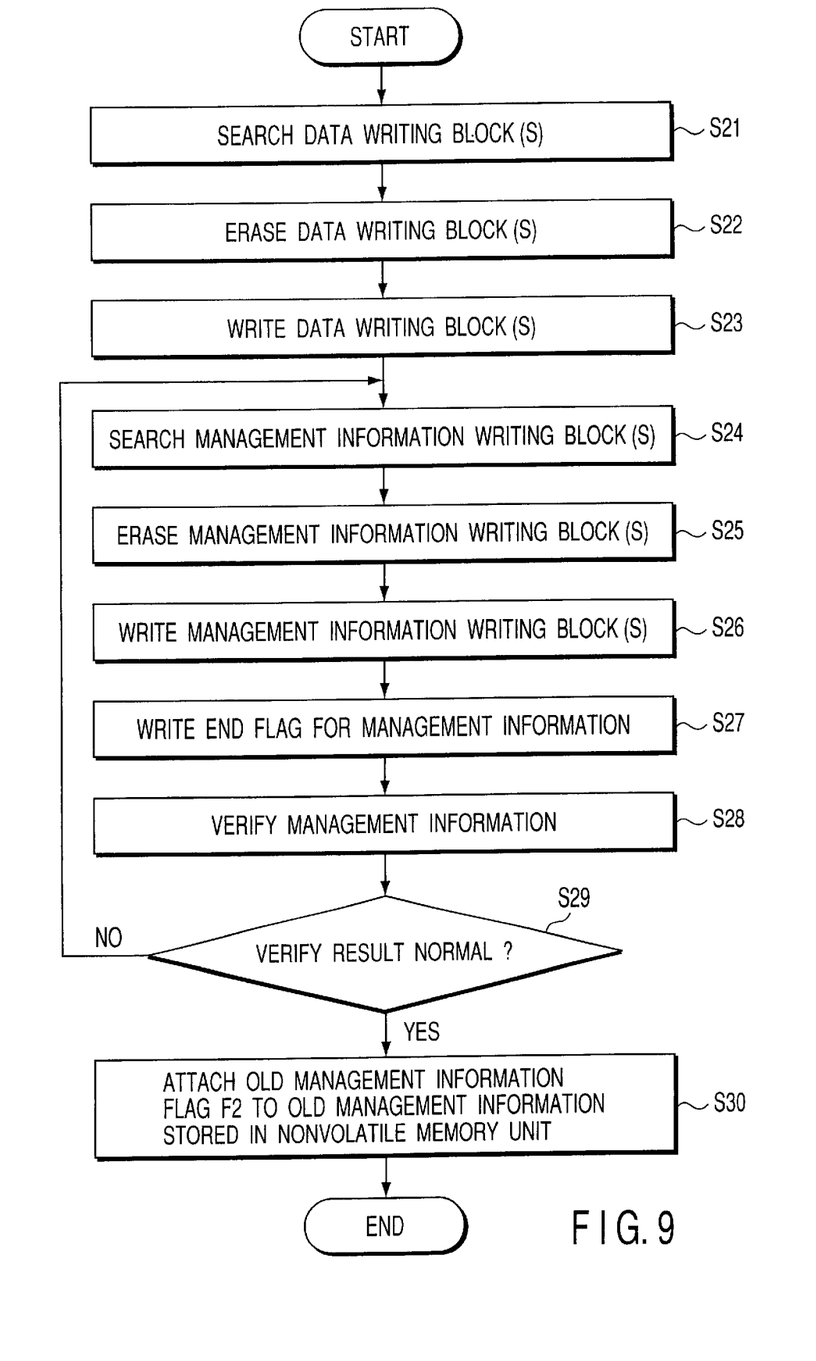
FIG. 9 is a flowchart useful in explaining a write operation executed in the embodiment.

Referring then to the flowchart of FIG. 9, the operation of the memory system (memory card) 10 executed to write data will be described.

Upon receiving a request for data writing from the host system, the controller 11 searches the physical blocks of the nonvolatile memory unit 13 for an unoccupied physical block, which can be used for data writing (step S21). The search for an unoccupied block (a block for data writing) is executed by searching for the assign table 122, one of the management information items, stored in the table area 120 of the RAM 12. Subsequently, the controller 11 erases data in the unoccupied block retrieved at the step S21 (step S22). This block erasure is executed by writing data "1" into all bits of the block.

The controller 11 writes data, designated by the host system, into the block whose data has been erased at the step S22 (step S23). If the designated data is less than one block, and if a physical block assigned to the designated logical block exists, the data of the physical block and the designated data are synthesized into new write data of one block. The newly created write data is written into the block whose data has been erased. This new write data is obtained by replacing a page corresponding to designated data included in the data of the physical block, with the designated data. Whether or not a physical block assigned to a designated logical block exists is detected from the translation table 121 stored in the table area 120 of the RAM 12.

If the request for writing supplied from the host system requests access to a plurality of logical blocks, the controller 11 operates as follows: First, the controller 11 retrieves the same number of unoccupied physical blocks as that of the requested logical blocks, thereby erasing their data (steps S21 and S22). Subsequently, the controller 11 writes data into the blocks in units of one block (step S23).

A description will be again given of the case where only one block is to be searched for. After executing the step S23, the controller 11 searches the physical blocks of the nonvolatile memory unit 13 for an unoccupied physical block that can be used for writing therein management information (step S24). The process of the step S24 is similar to that of the step S21, and the block search is executed by searching for the assign table 121 stored in the table area 120 of the RAM 12. After that, the controller 11 erases data stored in the retrieved, unoccupied block (a block capable of writing therein management information) (step S25).

Thereafter, the controller 11 executes a management information writing operation in the following manner to write, for example, management information into the block whose data has been erased at the step S25 (step S26). First, the controller 11 writes the assign table 132 into the data section 601 of page 1 of the block, and also writes the valid management information flag F1 into the flag field 602a of the redundancy section 602 of page 1. Then, the controller 11 writes the translation table 131 into the data sections 601 of pages 2–6 in units of one page, and also writes the valid management information flag F1 into the flag field 602a of the redundancy section 602 of each of pages 2–6. This means that management information is written in the page in which the valid management information flag F1 is written, i.e. in which the flag F1 is in the ON state.

The management information (the assign table 132 and the translation table 131) to be written into the block whose data has been erased at the step S25 can be created from the management information (the assign table 122 and the translation table 121) currently stored in the table area 120 of the RAM 12, i.e. from the management information used for data writing at the step S23. More specifically, a new assign table 132 is created in which that of the entries in the assign table 122, which corresponds to the block whose data was erased at the steps S22 and S25, has been changed from an unoccupied state to a used state. Further, a new translation table 131 is created, in which that of the entries in the translation table 121, which corresponds to a logical block designated by the host system, is changed to a physical block number indicative of the physical block whose data was erased at the step S25.

The controller 11 proceeds to step S27 after having written all management information into the block from which data was erased (step S26). The fact that all management information has been written into the block from which data was erased means that the last page portion of the translation table 131 has been written into the data section 601 of page 6 of the block, and the valid management information flag F1 has been written into the flag field 602a of the redundancy section 602 of page 6 of the block. At the step S27, the controller 11 writes a valid end flag EF into the flag field 602b of the redundancy section 602 of page 6 into which the last information is written at the step S26. The writing of the valid flag EF, i.e. the turn on of the EF flag, indicates that the writing of the management information has been finished.

After that, the controller 11 verifies the written management information so as to determine whether or not the management information writing operation has been executed normally (step S28). This verification can be executed by one of the following three methods. In the first method, the written management information is read and subjected to an error detection process (ECC checking) using an ECC set in the ECC field of the redundancy section 602. This method realizes high-speed verification since it executes verification only based on ECC checking. In the second method, previously written management information is temporarily stored in a predetermined area of the RAM 12 and read to be compared with currently written management information. The second method realizes more accurate verification than the first method. In the third method, verification is executed using the first and second methods. The third verification method is the most accurate of the three methods.

If the verification result at the step S28 is not normal (step S29), the controller 11 re-executes the process at the step S24 et seq. If, on the other hand, the verification result at the step S28 is normal (step S29), the controller 11 writes valid old management information flag F2 into a target block in relation to old management information stored in the nonvolatile memory unit 13 (step S30). In other words, the controller 11 writes valid old management information flag F2 into the flag fields 602c of the redundancy sections 602 of pages 1–6 of the block in which old management information is written. As a result, the use of old management information can be prevented. At the step S30, the controller 11 replaces the copies (the translation table 121 and the assign table 122) of management information stored in the table area 120 of the RAM 12, with the copies of the updated management information written at the step S26.

As described above, in the embodiment, after finishing data writing (step S23), new management information is written into another area of the nonvolatile memory unit 13 with the last management information maintained (step S26). A valid old management information flag F2 indicating that the last management information is old management information is attached to the last management information (step S30). Therefore, even if an abnormality occurs during the operation of writing data into the nonvolatile memory unit 13, thereby losing the updated management information in the nonvolatile memory unit 13, the updated management information can be restored from the old management information with the valid old management information flag F2 attached thereto (step S12). The use of this restored management information can prevent an abnormal state in which the nonvolatile memory unit is entirely unusable.

Further, in the embodiment, when writing management information in units of one page at the step S26, the valid management information flag F1 indicating that the management information is written is written in the redundancy section 602 of the same page as that of the management information. Accordingly, as illustrated in the flowchart of FIG. 8, when searching the nonvolatile memory unit 13 for management information, the area for the to-be-searched management information can be limited by detecting valid management information flag (steps S2 and S3). Thus, management information can be searched for efficiently.

Moreover, in the embodiment, after finishing the writing of management information (step S26), and before writing the old management information flag (step S30), the end flag EF indicating that the writing operation has been completely executed is written into the redundancy section 602 of the last page portion of the management information in relation to the management information (step S27). In this structure, management information with the end flag EF attached thereto and without the old management information flag F2 is used as updated management information. Therefore, even if an abnormality occurs during the operation of writing data into the nonvolatile memory unit 13, thereby losing updated management information in the nonvolatile memory unit 13, the operation of checking the end flag EF enables incompletely written management information not to be used. This prevents an abnormal state in the nonvolatile memory unit 13.

Furthermore, in the embodiment, after finishing the writing of the end flag (step S27), and before writing old management information flag (step S30), management information written at the step S26 is read and verified whether or not it has been normally written (step S28). In this structure, if the verification result indicates an error (step S29), the writing of the management information (step S26) is re-executed. Thus, the verification of written management information enables an error, if there is any during data writing in the nonvolatile memory unit 13, to be detected. The detected error can be eliminated by repeating the writing of the management information.

In addition, in the embodiment, when data should be written over a plurality of blocks, after writing all the data, new management information is written which reflects the writing of all the data. Where data is written in units of one block, and new management information that reflects the writing executed in units of one block (hereinafter referred to as "block writing") is written each time block writing is executed, if an abnormality occurs during the block wiring, unconformity occurs between data items to be written over a plurality of blocks. On the other hand, in the embodiment, management information is written after all data is written over a plurality of blocks, and hence conformity can be maintained between data items written over the blocks.

Also, in the embodiment, the RAM 12 as a volatile memory, which the nonvolatile memories 130-1–130-k of the nonvolatile memory unit 13 can access at a high speed, is provided in the memory system 10. When initializing the memory system 10, management information is read from the nonvolatile memory unit 13 and has its copy stored in the table area 120 of the RAM 12. Thus, in the embodiment, a copy of management information is stored in a RAM 12 (volatile memory), which is operable at a higher speed than a nonvolatile memory and does not require data erasure when rewriting data. In this structure, the management information stored in the RAM 12 can be used when normally accessing the nonvolatile memory unit to search for a block in which data is to be written (step S21), or to search for a block in which management information is to be written (step S4). As a result, high-speed processing can be realized.

A description will now be given of the respective states of the memory system 10 assumed when the supply of power thereto is interrupted at time points TM1–TM17. The interruption of power is caused by, for example, pulling the memory system (memory card) 10 out of the host system.
TM1: Before Step S21

This is a case where the supply of power to the memory system 10 is interrupted before executing the step S21. In this case, no write process has been executed. Accordingly, the nonvolatile memory unit 13 is in a state assumed before writing data, and no problem occurs.
TM2: During the Execution of the Step S21

This is a case where the supply of power is interrupted while a block for writing data therein (hereinafter referred to as a "data writing block") is being searched for at the step S21. Even if the supply of power is interrupted during the execution of the step S21, no process is executed in the nonvolatile memory unit 13. In other words, the nonvolatile memory unit 13 is in the same state as that assumed before writing, and no problem occurs.
TM3: Between the Steps S21 and S22

This is a case where the supply of power is interrupted before the execution of the step S22 after the process of searching for the data writing block at the step S21. In this case, only the data writing block is searched for, and no process is executed in the nonvolatile memory unit 13. In other words, the nonvolatile memory unit 13 is in the same state as that assumed before writing, and no problem occurs.
TM4: During the Execution of the Step S22

This is a case where the supply of power is interrupted while data in the data writing block is being erased at the step S22. In this case, the erasure of the data of the block detected at the step S21 is not completed. However, even if data is written into the block after power is resupplied, no problem occurs since an erasure operation is always executed before data writing.
TM5: Between the Steps S22 and S23

This is a case where the supply of power is interrupted after data in the data writing block is erased at the step S22 and before data writing is executed at the step S23. In this case, data erasure is executed only in the unoccupied block, and no problem occurs.
TM6: During the Execution of the Step S23

This is a case where the supply of power is interrupted while data is being written at the step S23. In this case, incompletely written data is left in the data writing block. However, the block into which data has been written was an unoccupied block. Accordingly, the management information is not updated and hence is in the state assumed before the execution of data writing. This causes no problem.

TM7: Between the Steps S23 and S24

This is a case where the supply of power is interrupted after the execution of data writing at the step S23 and before the execution of the step S24. Although in this case, the data writing is finished, the management information is not updated. However, in the same manner as at the time point TM6, the block into which data has been written was an unoccupied one. Therefore, the management information is not updated and hence is in the state assumed before the execution of data writing. This causes no problem.

TM8: During the Execution of the Step S24

This is a case where the supply of power is interrupted while a block for writing management information therein (hereinafter referred to as a "management information writing block") is being searched for at the step S24. In this case, the same state as at the time point TM7 is assumed, and hence no problem occurs.

TM9: Between the Steps S24 and S25

This is a case where the supply of power is interrupted after the process of searching for the management information writing block at the step S24 and before the execution of the step S25. In this case, the same state as at the time point TM7 is assumed, and hence no problem occurs.

TM10: During the Execution of the Step S25

This is a case where the supply of power is interrupted while data in the management information writing block is being erased at the step S25. In this case, the erasure of the data of the block is not completed. However, even if data is written into the block after power is resupplied, no problem occurs since an erasure operation is always executed before data writing. Further, although in this case, the data writing is finished and the management information is not updated, no problem occurs for the same reason as stated at the time point TM7.

TM11: Between the Steps S25 and S26

This is a case where the supply of power is interrupted after data in the management information writing block is erased at the step S25 and before the execution of the step S26. In this case, since data erasure is executed only in the unoccupied block, no problem occurs. Further, although in this case, the data writing is finished and the management information is not updated, no problem occurs for the same reason as stated at the time point TM7.

TM12: During the Execution of the Step S26

This is a case where the supply of power is interrupted while management information is being written at the step S26. In this case, incompletely written management information exists. However, the next step S27 has not yet been executed, and hence the valid end flag EF indicating that the writing of management information is finished has not yet been written. Accordingly, after power is resupplied, the management information is determined to be incomplete, and hence is not used. Furthermore, since old management information is maintained in the nonvolatile memory unit 13, the same state as assumed before writing the management information is maintained. Accordingly, new management information can be created on the basis of the old management information at the step S12. In addition, although in this case, the data writing is finished and the management information is not updated, no problem occurs for the same reason as stated at the time point TM7.

TM13: Between the Steps S26 and S27

This is a case where the supply of power is interrupted after the management information is written at the step S26 and before the execution of the step S27. Although in this case, the management information has been written, the end flag EF is kept invalid (in the OFF state). Since the end flag EF is invalid (OFF), the management information is determined to be incomplete after power is resupplied, and hence is not used. Moreover, since the old management information is left in the nonvolatile memory unit 13, the same state as assumed before writing the management information is maintained. Accordingly, new management information can be created on the basis of the old management information. In addition, although in this case, the data writing is finished and the management information is not updated, no problem occurs for the same reason as stated at the time point TM7.

TM14: During the Execution of the Step S27

This is a case where the supply of power is interrupted while the valid end flag EF is being written at the step S27. Although in this case, the management information has been written, the end flag EF is kept invalid (in the OFF state). Since the end flag EF is invalid, the management information is determined to be incomplete after power is resupplied, and hence is not used. Moreover, since the old management information is left in the nonvolatile memory unit 13, the same state as assumed before writing the management information is maintained. Accordingly, new management information can be created on the basis of the old management information. In addition, although in this case, the data writing is finished and the management information is not updated, no problem occurs for the same reason as stated at the time point TM7.

TM15: Between the Steps S27 and S30

This is a case where the supply of power is interrupted after the valid end flag EF is written at the step S27 and before the execution of the step S30. In this case, both newly written management information and old management information, which are determined to be normal, exist. Therefore, after power is resupplied, two courses of action can be taken. In one course of action, the newly written management information is used. This case indicates that the writing operation requested by the host system is normally finished. In the other course of action, the old management information is used. This case indicates that the writing operation requested by the host system has not yet been finished. However, in both the cases, since the supply of power is interrupted during the writing operation requested by the host system, no abnormality occurs in the memory system (memory card) 10.

TM16: During the Execution of the Step S30

This is a case where the supply of power is interrupted while the valid old management information flag F2 is being written at the step S30. In other words, this is a case where the supply of power is interrupted while the old management information is being written into the block. In this case, it is possible that the old management information is abnormal. However, in the embodiment, as illustrated in the flowchart of FIG. 8, it is determined, when the power has been resupplied, whether or not the management information is normal, whereby normal management information is used. If the old management information is abnormal, new management information is used instead of the old information. Thus, the memory system assumes the state in which the data writing requested by the host system has been normally finished, and causes no problems.

TM17: After Finishing the Step S30

This is a case where the supply of power is interrupted after the valid old management information flag F2 is written at the step S30. In this case, the writing operation has been finished normally, and no problem occurs.

As described above, the embodiment is free from any problems even if the supply of power to the memory system 10 is interrupted at any time point as a result of, for example, pulling the system 10 out of the card slot of the host system. More specifically, the embodiment is free from an abnormal state in which data cannot be normally written into the nonvolatile memory unit 13, or data cannot be read therefrom as a result of the use of incompletely written management information. This advantage can be also realized when the power voltage has been reduced, as well as when the supply of power has been interrupted.

Although the above-described embodiment employs only one translation table 131 and one assign table 132 as management information for all the blocks of the nonvolatile memory unit 13, the present invention is not limited to this structure. For example, the physical address space of the nonvolatile memory unit 13 and the logical address space assigned to the nonvolatile memory unit 13 may be each divided into a number "r" of zones 0-r-1. The zones 0-r-1 of the physical address space are formed of a predetermined number "p" of blocks. Further, the zones 0-r-1 of the logical address space are formed of a predetermined number "q" of blocks. Further, each zone "i" (i=0 r-1) may employ a pair of tables; a translation table 131 indicative of physical blocks assigned to respective logical blocks in each zone "i", and an assign table 132 indicative of usable physical blocks in each zone "i". In this case, it is sufficient if the table area 120 of the RAM 12 stores a copy of some pairs of tables 131 and 132 instead of a copy of all pairs of them.

This structure enables a reduction of the required size of the table area 120, and hence reduction of the required capacity of the RAM 12. However, in this case, it is necessary to check, when the host system has requested access to the nonvolatile memory unit 13, whether or not the copy of a translation table 131 necessary to translate a logical block into access-requested physical blocks is stored in the table area 120. If this copy is not stored, it is necessary to replace one of the copies stored in the table area 120, with the copy of a target pair of tables 131 and 132.

In addition, although, in the above-described embodiment, the controller 11 for controlling the nonvolatile memory unit 13 is incorporated in the memory system 10 that contains the nonvolatile memory unit 13, the present invention is not limited to this structure. For example, the controller 11 may be incorporated in the host system that uses the memory system 10. Further, the RAM 12 may be contained in the controller 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A controller for controlling a nonvolatile memory unit that is formed of at least one nonvolatile memory and stores management information for the nonvolatile memory unit, comprising:

means for writing, after writing of data into the nonvolatile memory unit, new management information that reflects the writing of data, into an area of the nonvolatile memory unit other than an area of the nonvolatile memory unit which stores last management information;

means for writing, after the management information writing by the management information writing means, an old management information flag indicating that management information written by the management information writing means is old management information, in relation to the last management information stored in the nonvolatile memory unit;

means for searching the nonvolatile memory unit for updated, normal management information when the nonvolatile memory unit is initialized; and means for restoring updated management information on the basis of normal old management information related to the old management information flag, if the search means does not find the updated, normal management information.

2. The controller according to claim 1, further comprising means for writing an end flag, indicating that the management information writing means has completely finished the management information writing, in relation to management information written by the management information writing means, after the management information writing by the management information writing means and before the old management information writing by the old management information flag writing means, and wherein the search means determines that management information related to the end flag and unrelated to the old management information flag is updated management information.

3. The controller according to claim 2, further comprising verify means for reading the management information written by the management information writing means, verifying whether or not the management information is normally written, and causing the management information writing means to re-execute the management information writing if the verify result indicates an error, after the end flag writing by the end flag writing means and before the old management information writing by the old management information flag writing means.

4. The controller according to claim 1, wherein the management information is formed of a plurality of pages, and further comprising means for writing, in parallel with the management information writing by the management information writing means, a management information flag indicating that management information has been written by the management information writing means, for each page of the management information, and wherein the search means searches the nonvolatile memory unit for the management information flag to limit an area in which to-be-searched management information exists.

5. A controller for controlling a nonvolatile memory unit that is formed of at least one nonvolatile memory and stores management information for the nonvolatile memory unit, comprising:

a program memory storing a control program configured to control the nonvolatile memory unit; and a CPU configured to execute the control program stored in the program memory to thereby control the nonvolatile memory, the CPU writing, after writing data into the nonvolatile memory unit, new management information that reflects the data wiring, into an area of the nonvolatile memory unit other than an area thereof which stores last management information, the CPU writing, after writing the management information, an old management information flag in relation to the last management information stored in the nonvolatile memory unit, the old management information flag indicating that the management information is old management information, the CPU searching the nonvolatile memory unit for updated, normal management information when initializing the nonvolatile memory unit, and the CPU restoring updated management information on the basis of normal old management information related to the old management information flag if the CPU does not find the updated, normal management information.

6. A memory system comprising:

a nonvolatile memory unit formed of at least one nonvolatile memory and storing management information for the nonvolatile memory unit; and a controller configured to control the nonvolatile memory unit, the controller including:

means for writing, after writing of data into the nonvolatile memory unit, new management information that reflects the writing of data, into an area of the nonvolatile memory unit other than an area of the nonvolatile memory unit which stores last management information;

means for writing, after the management information writing by the management information writing means, an old management information flag indicating that management information written by the management information writing means is old management information, in relation to the last management information stored in the nonvolatile memory unit;

means for searching the nonvolatile memory unit for normal updated management information when the nonvolatile memory unit is initialized; and means for restoring updated management information based on normal old management information related to the old management information flag, if the search means does not find the updated, normal management information.

7. The memory system according to claim 6, wherein:

the management information is formed of a plurality of pages;

the controller further comprises means for writing an end flag, indicating that the management information writing means has completely finished the management information writing, in relation to management information written by the management information writing means, after the management information writing by the management information writing means and before the old management information writing by the old management information flag writing means; and the search means determines that management information related to the end flag and unrelated to the old management information flag is updated management information.

8. The memory system according to claim 7, wherein the controller further comprises verify means for reading the management information written by the management information writing means, verifying whether or not the management information is normally written, and causing the management information writing means to re-execute the management information writing if the verify result indicates an error, after the end flag writing by the end flag writing means and before the old management information writing by the old management information flag writing means.

9. The memory system according to claim 6, wherein:

the controller further comprises means for writing, in parallel with the management information writing by the management information writing means, a management information flag indicating that management information has been written by the management information writing means, for each page of the management information; and the search means searches the nonvolatile memory unit for the management information flag to limit an area in which to-be-searched management information exists.

10. The memory system according to claim 6, further comprising a volatile memory which can be accessed at a higher speed than the nonvolatile memory, the volatile memory being configured to store a copy of updated, normal management information searched for by the search means.

11. The memory system according to claim 10, further comprising means for using a copy of management information stored in the volatile memory in place of the management information stored in the nonvolatile memory unit, when accessing the nonvolatile memory unit.

12. The memory system according to claim 10, wherein the search means comprises:

management information read means for reading management information from the nonvolatile memory unit and storing a copy of the read management information into the nonvolatile memory, at the time of initialization of the memory system;

means for determining whether or not the management information read by the management information read means is updated and normal management information; and means for causing the management information read means to read different management information if the determination means determines that the management information read by the management information read means is not updated and normal management information.

13. A method of controlling a nonvolatile memory unit formed of a plurality of physical blocks and configured to store management information for the nonvolatile memory unit, comprising:

responding to a request for writing data into the nonvolatile memory unit, thereby writing the data into the nonvolatile memory unit;

writing, after writing of data into the nonvolatile memory unit, new management information that reflects the writing of data, into an area of the nonvolatile memory unit other than an area of the nonvolatile memory unit which stores last management information;

writing, after writing the new management information, an old management information flag indicating that the last management information is old management information, in relation to the last management information stored in the nonvolatile memory unit;

searching the nonvolatile memory unit for updated, normal management information when initializing the nonvolatile memory unit; and restoring updated management information on the basis of normal, old management information related to the old management information flag, if the updated, normal management information is not found.

14. The method according to claim 13, wherein if data designated by the data writing request is written over a plurality of blocks, after the designated data has been completely written during the data writing, the new management information that totally reflects the data writing is written in the management information writing.

* * * * *